United States Patent [19]

Baldi et al.

[11] 4,027,418

[45] June 7, 1977

[54] RESILIENT TUBING-POWERED GIG FOR SPEARING FISH

[76] Inventors: Daniel Gerard Baldi, 36 Crestfield Drive, Brockton, Mass. 02402; James Allen Baldi, 120 Sumner St., Newton Centre, Mass. 02159

[22] Filed: Mar. 4, 1976

[21] Appl. No.: 663,977

[52] U.S. Cl. .................................................. 43/6
[51] Int. Cl.² ...................................... A01K 81/04
[58] Field of Search ............... 43/6, 19; 124/22, 26, 124/31

[56] References Cited
UNITED STATES PATENTS

| | | | |
|---|---|---|---|
| 2,537,754 | 1/1951 | Hanshaw | 43/6 |
| 3,057,338 | 10/1962 | Iwamoto | 124/22 |
| 3,340,642 | 9/1967 | Vasiljevic | 43/6 |

FOREIGN PATENTS OR APPLICATIONS 926,806   4/1947   France ................... 124/22

Primary Examiner—Warner H. Camp

[57] ABSTRACT

The invention is a gig for spearing fish. It has a handgrip with a bore, longer in its vertical axis than in its horizontal axis, running lengthwi,e through it. Slidably mounted in the bore is a spear shaft propelled by a loop formed of resilient tubing attached to the end of the spear shaft and also to the end of the handgrip. When the spear shaft is pushed backward into the handgrip, the kerf, which is cut around the spear shaft near the front end, engages a pin transversing the bore near the top of the bore so as to secure the spear shaft in a state of readiness. Pushing down on the front portion of the spear shaft, which is inclined upward in the bore of the handgrip, releases the kerf from the pin and allows the spear shaft to be propelled forward as the resilient tubing contracts.

1 Claim, 7 Drawing Figures

U.S. Patent   June 7, 1977   4,027,418
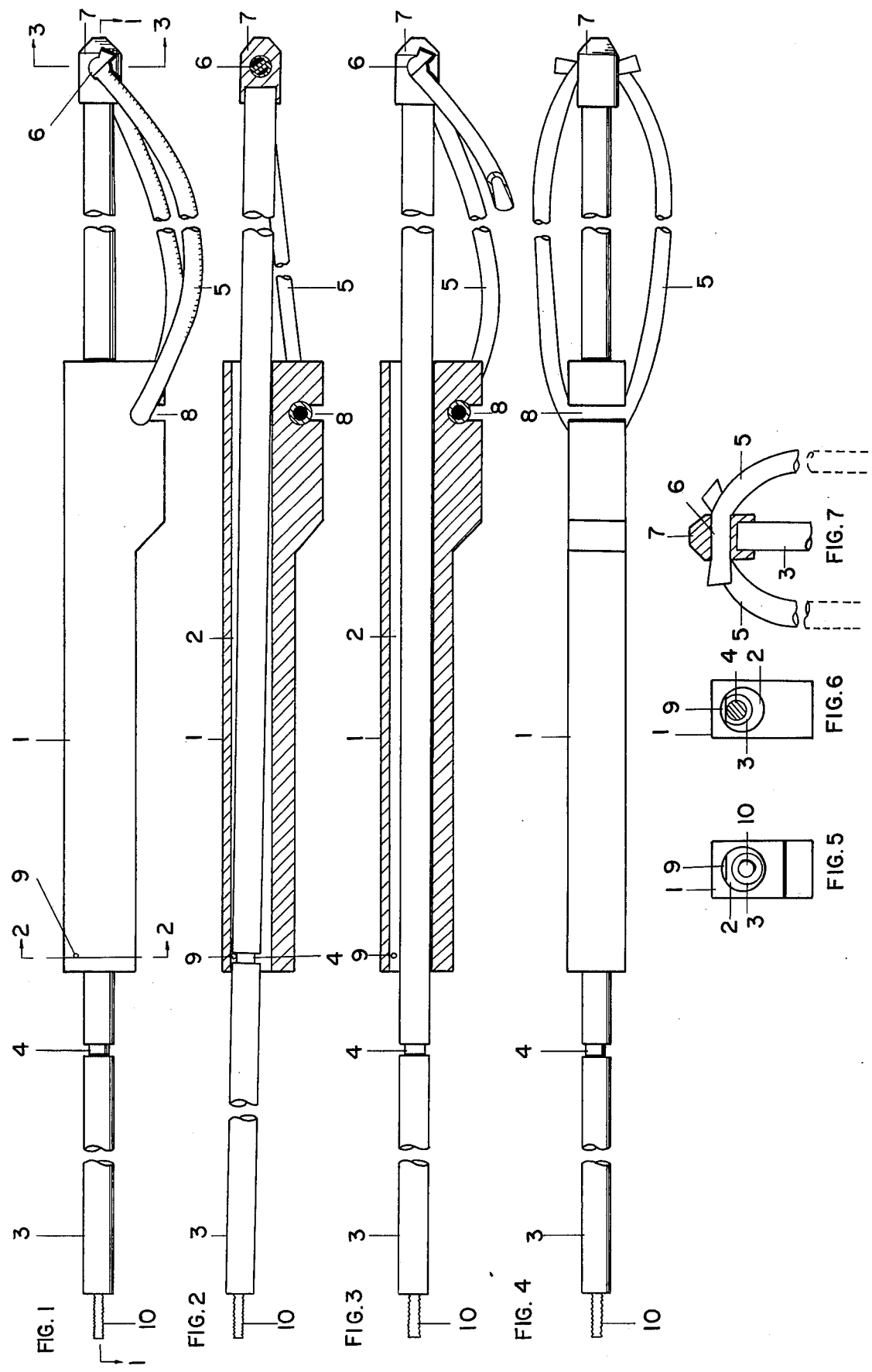

RESILIENT TUBING-POWERED GIG FOR SPEARING FISH

BACKGROUND OF THE INVENTION

The invention relates specifically to spearing devices which are hand held and which are powered by resilient bands. As scuba diving becomes more popular and more equipment is developed for divers to use, it becomes increasingly more important for apparatus to be devised that is simple to use and that can be used with one hand whenever possible. With that in mind, the invention herein described fills the following criteria: the spearing device is held with one hand; it is set in readiness simply by pushing the spear shaft against any solid surface while holding the grip with one hand; it is aimed and fired with one hand. The device is accurate, powerful, and quick to use. There is no hand fatigue such as that experienced when using the popular hand-held spear poles that require a rubber band to be looped over the thumb and the pole to be held tightly by hand against stretched rubber tubing until released. Other spearing gigs require two-hand operation since the spear shafts must be precisely aligned in order for their locking and releasing mechanisms to function. Because of its unique design, our invention does not require the spear shaft to be turned, twisted, or aligned when the spearing device is being loaded. Other spearing devices such as described in Chappell U.S. Pat. No. 3,456,376, Hanshaw U.S. Pat. No. 2,537,754, and Thorburn U.S. Pat. No. 2,869,273 require not only precise alignment of their spear shafts but also mechanical triggering devices; ours does not: it can be fired simply by pushing down on the spear shaft itself with the thumb of the hand holding the handgrip.

In summary, it is the object of the invention to provide a very simpl5 spearing gig which is powered by readily available resilient tubing such as surgical rubber tubing and which is powerful, accurate, and operable with one hand. We feel that our invention achieves these goals.

The invention has other advantageous features which are described in the following description of the preferred form of the invention which is illustrated in the drawing accompanying and forming part of the specification. It is to be understood, however, that variations in the preferred form can be adopted within the scope of the invention as set forth in the claims.

DESCRIPTION OF THE DRAWINGS

FIG. 1 is an external view of the invention in its unloaded position.

FIG. 2 is a cross section on a plane of 1—1 of the invention in a loaded position.

FIG. 3 is a cross section on a plane of 1—1 of the invention in an unloaded position.

FIG. 4 is an external view of the bottom.

FIG. 5 is a front view on a plane of 2—2, showing the position of the spear shaft in relationship to the pin when the spear shaft is unloaded.

FIG. 6 is a front view on a plane of 2—2, showing the position of the spear shaft in relationship to the pin when the spear shaft is in a loaded position.

FIG. 7 is a cross-sectional view of the end cap on a plane of 3—3, showing how the resilient tubing passes through it.

DESCRIPTION OF THE SPECIFICATION

The handgrip 1 has a bore 2, larger in its vertical axis than in its horizontal axis, running through it. A spear shaft 3 with a kerf 4 around it near the forward end is slidably mounted in the bore 2. Attached to the rearward end of the spear shaft 3 is a piece of resilient tubing 5 made into a loop by passing the ends in opposite directions through a hole 6 in the end cap 7. The diameter of the hole 6 in the end cap 7 is no larger than the outer diameter of the resilient tubing 5 so that, with the two ends of the resilient tubing 5 passing through it, a very tight fit is accomplished and the resilient tubing 5 does not pull out when bent at a right angle to the end cap 7 (such is the case when the invention is being used). The other end of the loop of resilient tubing 5 is slipped into a slotted hole 8 running crosswise through the rear of the handgrip 1 and below the bore 2. Transversing the bore 2 near the roof of the bore 2 is a pin 9 which is parallel to the kerf 4 because it is at a right angle to the spear shaft 3 which slides under the pin 9 in the bore 2. The resilient tubing 5 which is attached to the rear of the handgrip 1 and to the end of the spear shaft 3 pulls the rear of the spear shaft 3 down when the resilient tubing 5 is stretched tight, causing the front of the spear shaft 3 to incline upward inside the bore 2 as it pivots against the lower back edge of the bore 2. When the spear shaft 3 is moved backward through the bore 2, the inclination is maintained; thus, the kerf 4 engages the pin 9, locking the spear shaft 3 in a state of readiness. As forward pressure is maintained on the spear shaft 3 by the stretched resilient tubing 5, the kerf 4 remains locked by the pin 9 until the front of the spear shaft 3 is pushed downward, thereby disengaging the kerf 4 from the pin 9 and causing the resilient tubing 5 to contract and to move the spear shaft 3 forward. The front of the spear shaft 3 is provided with a threaded stem 10 so as to allow the use of a number of readily available spear points.

What we claim as our invention is as follows:

1. A fish spearing gig comprising, in combination, (1) a handgrip; (2) a spear shaft with a kerf around it, slidably mounted in a bore, longer in its vertical axis than in its horizontal axis, running longitudinally through the handgrip; (3) a pin transversing the bore near the roof of said bore in the handgrip to engage the kerf in the slidably mounted spear shaft; (4) a loop formed of resilient tubing to power the spear shaft, attached to the rearward end of the spear shaft and to the handgrip in a hole that has a slot in its wall and that transverses the handgrip under the bore; (5) an end cap with a hole transversing it so that the cut ends of the resilient tubing pass through it in opposite directions to complete the loop, said resilient tubing being stretched tight as the spear shaft is moved backward through the bore in the handgrip, causing the spear to incline upward to allow the engagement of the pin by the kerf in the spear shaft so that the spear is ready to be fired by pushing the front of the spear shaft downward, thus disengaging the kerf from the pin and allowing the spear to move forward as the resilient tubing contracts.

* * * * *